United States Patent [19]
Rissberger

[11] 3,715,088
[45] Feb. 6, 1973

[54] STRIP STORAGE DEVICE

[75] Inventor: Arthur C. Rissberger, Webster, N.Y.

[73] Assignee: Eastman Kodak Company, Rochester, N.Y.

[22] Filed: June 29, 1970

[21] Appl. No.: 50,769

[52] U.S. Cl. ................................................ 242/74
[51] Int. Cl. ........................................... B65h 75/28
[58] Field of Search ............................ 242/74, 68.5

[56] References Cited

UNITED STATES PATENTS

| | | | |
|---|---|---|---|
| 3,439,881 | 4/1969 | Ulmschneider | 242/74 X |
| 3,184,178 | 5/1965 | Bodge | 242/74 |
| 3,128,959 | 4/1964 | Pelson | 242/74 |
| 2,704,641 | 3/1955 | Schnetzer et al. | 242/74 |
| 3,288,392 | 11/1966 | Goldberg | 242/74 |
| 3,318,549 | 5/1967 | Macomber | 242/74 |

*Primary Examiner*—George F. Mautz
*Attorney*—Walter O. Hodson and Robert F. Crocker

[57] ABSTRACT

1 A film spool including a hub cavity formed in the hub. A film slot is provided in the hub and communicates with a channel formed in the cavity to hold the film end during take-up onto the spool. The channel is comprised of a raised rib formed in spaced relationship from a portion of the cavity sidewall. The rib cooperates with the sidewall to force the film end into an arcuate path and restrains the film end from springing back out through the film slot during take-up.

6 Claims, 5 Drawing Figures

PATENTED FEB 6 1973
3,715,088

ARTHUR C. RISSBERGER JR.,
INVENTOR.

BY
ATTORNEYS

STRIP STORAGE DEVICE

BACKGROUND OF THE INVENTION

The present invention relates to devices for storing strips or the like. More particularly the invention relates to the storage of strips or the like on a hub about which the strips may be wound.

In the use of film spools, for example, it is customary to wind film upon a spool by positioning one end of the film through a slot formed in the hub so that the film end may be at least momentarily held while the first few laps of film are wound.

One film spool which is threaded in this manner is described in my U.S. Pat. No. 3,330,494. This film spool is of the universal type and as such is reversibly positionable on a spindle for use with various types of photographic apparatus, such as copy cameras and film readers.

In the spool described in my prior patent the film slot leads into a cavity that is formed in the interior of the hub. When the film is placed into the slot it is forced to flex and follow the generally curved path defined by the sidewalls of the cavity. The film end is releasably held in this cavity while the film is on the spool.

While this spool functions quite satisfactorily with the use of cellulose acetate base film, a problem has been encountered with the retention of thin polyethylene terephthalate base film which is being used more and more in the film manufacturing industry. Because of the spring action of the latter-mentioned film base and its thin relationship to the width of the slot, there is a tendency for the film to spring back out of the cavity through the slot when the spool is rotated for take-up. This backing out can occur in such a short time that there is insufficient time for any of the film laps to be made and consequently the film will not wind. In order to get the film to be taken-up repeated attempts must be made until a successful "catch" is achieved. Obviously this presents an inconvenience to the persons using these spools, since precious time is lost which otherwise could be more productively used elsewhere.

This problem of getting the film to take up is by no means new. It is of long standing duration and in the past several suggestions have come forth in an attempt to satisfactorily overcome the problem. For example, in the published Alien Property Custodian Application SEr. No. 405,443 there is disclosed the use of a multiple membered hub, wherein the members are movable toward each other to grip the film end therebetween for take-up onto the reel. To permit release of the film end from the reel, the reel includes springs which force the gripping members apart. While this reel may give satisfactory results it has the disadvantage that it is impossible to be molded in one operation, which is the preferred method of production where production in the thousands is anticipated. Other disadvantages are the relatively high cost of manufacturing the separate parts and the additional cost for assembly.

Other suggestions have been proposed but they are either not usable with an automatic threading apparatus, require the storage device to have flanges, do not readily release the film, or are not amenable to be molded in one piece.

Therefore it is an object of this invention to provide a device overcoming the above disadvantages of the prior art.

Other objects and advantages of the present invention will be apparent to those skilled in the art by the description of a preferred embodiment of the invention which follows.

SUMMARY OF THE INVENTION

The present invention provides a storage device for strips or the like which includes a core about which the strips may be wound, a channel formed in the interior of the core for holding an end portion of the strips, the channel being in communication with a slot formed in the core and including sidewalls for guiding the strip end in an arcuate path, the sidewalls including a first axially extending guide wall having a generally concave portion and a second axially extending guide wall immovable with respect to the first guide wall and spaced from respective portions of the first guide wall a distance greater than the thickness of the film so as to cooperate with the first guide wall to cause the end portion of the strip to assume a generally concave configuration in the channel.

BRIEF DESCRIPTION OF THE DRAWING

Reference is now made to the accompanying drawing wherein like reference numerals and characters designate like parts and wherein.

DESCRIPTION OF THE PREFERRED EMBODIMENT

Figure 3:
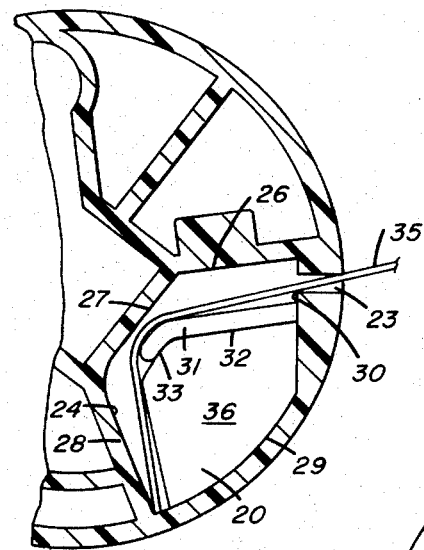
FIG. 3 is a fragmentary cross sectional view taken through a plane passing through the core between and parallel to the flanges of the reel shown in FIG. 1 and showing a film end threaded in the core.
Figure 1:
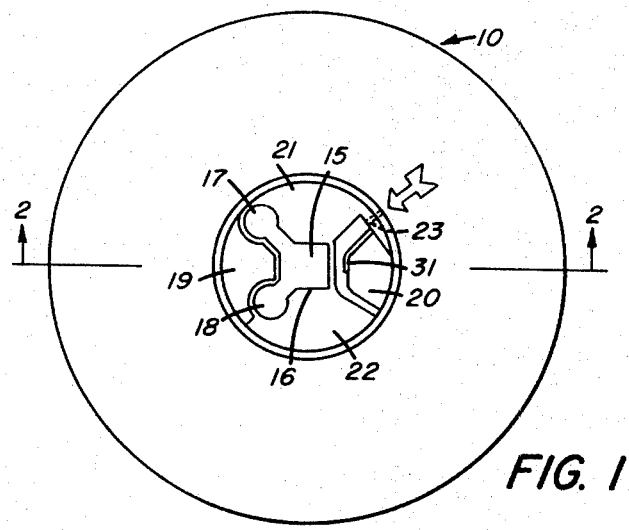
FIG. 1 is a side view of one face of a spool incorporating my invention.
Figure 2:
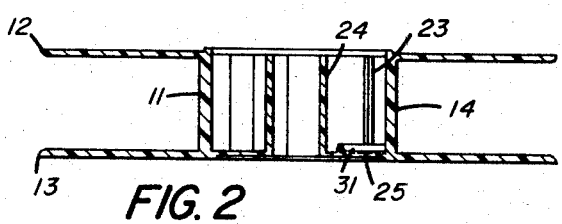
FIG. 2 is a cross sectional view, taken on the line 2—2 of FIG. 1.

With particular reference to FIGS. 1-3 there is shown a plastic universal film spool 10 of the general type described in my U.S. Pat. No. 3,330,494. The spool includes a hub or core 11 and a pair of spaced flanges 12, 13 secured to and concentric with the ends of the hub. Although the preferred embodiment of the invention is described as a spool having flanges it should be appreciated that one advantage of my invention is that it may be used with cores not having flanges.

The outer part of the hub 11 comprises a cylindrical surface 14 about which the film is to be wound. The interior of the hub includes a spindle receiving aperture 15 which extends axially completely through the spool. The aperture 15 is slightly modified from that shown in the patent and includes a rectangular shaped slot portion 16 with a pair of keyhole shaped slots 17, 18 radially extending from adjacent corners of the rectangular portion. As is now conventional in these types of spools, a plurality of eccentrically positioned cavities are formed in the interior of the reel about the spindle aperture 15 to reduce the amount of material needed to form the spool. Each of the cavities is defined by a generally axially extending sidewall and a radially extending end wall formed at one end of the hub, thereby leaving the cavity open at the other end. It should be appreciated that the axially extending walls are usually not formed perfectly parallel to the axis since it is good molding practice to mold them with a slight taper to permit easy stripping of the spool from the mold.

In the view shown in FIG. 1 two cavities 19, 20 are visible. Two radially extending end walls 21, 22 are also visible and these end walls in conjunction with sidewalls not shown form cavities that are visible when viewing the opposite side of the spool.

Attention will now be particularly directed to the portion of the spool involving the threading and take-up of the film, it being understood that the other portions of the spool are similar to that shown in my patent and are not necessary to the full understanding of my invention.

With reference to FIGS. 1 and 3, the spool is of the type having a radially extending film slot 23 formed in the hub outer surface 14. As shown in FIG. 1 an arrow may be formed on the flange to indicate the position of the slot 23, the arrow being formed by molding the flange with a grainy appearance while leaving the arrow portion smooth and thus distinctive. The slot 23 leads into cavity 20 which is the cavity that is to hold the film end during take-up. Cavity 20 is defined by a generally axially extending sidewall 24 and a radially extending end wall 25. Side wall 24 is comprised of a plurality of straight and curved segments 26, 27, 28, 29 and 30 which define in the view shown in FIG. 3 an almost closed figure, with a slight break in segment 30 being made for the film slot 23. The cavity 20 includes a generally U-shaped film retention channel which is defined by end wall 25 and a pair of spaced guide walls. The first guide wall is comprised of sidewall segments 26, 27 and 28 which in combination define a generally concave wall for guiding the film end in an arcuate path as it is moved into the cavity 20. The second guide wall is formed as a rib 31 and is molded integral with end wall 25. Rib 31 extends generally axially for a distance of preferably about one-eighth the height of the core 11 and includes two straight rib segments 32, 33. Rib segment 32 is molded integral with and extends from segment 30 of side wall 24 in a direction generally parallel to that of segment 26. Rib segment 33 is joined to rib segment 32 and extends generally parallel to segment 27. The junction between rib segments 32 and 33 is rounded to facilitate the change in direction of the film end as it follows the path defined by the guide walls.

Figure 4:
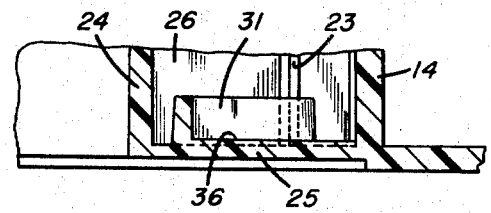
FIG. 4 is a magnified view of a portion of the cross sectional view shown in FIG. 2.

In FIG. 4 the U-shape of the channel is shown and a plateau 36 is also shown formed in the portion of the cavity 20 that does not include the film retention channel. The plateau 36 is actually a thickened part of the end wall 25 and is formed because it facilitates molding of the spool. It also has the advantage that should the film end turn along sidewall segment 29, greater retention will result since the difference in elevation between the leading edge of the film end and the remainder of the film end in the channel causes the film end to be wedged in the cavity.

Figure 5:
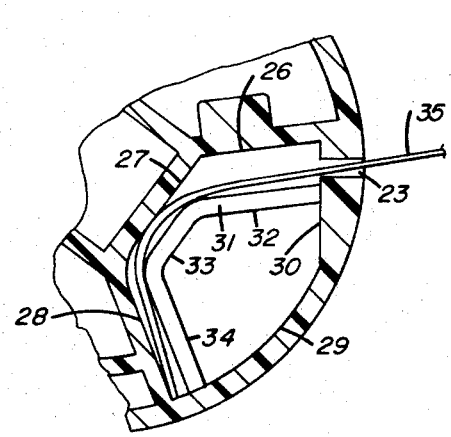
FIG. 5 is a fragmentary cross sectional view similar to that of FIG. 3 and illustrating a modification of the spool shown in FIGS. 1–4.

In the modified embodiment shown in FIG. 5, rib 31 is extended to include a rib segment 34 that is parallel to straight wall segment 28. The junction between rib segment 33 and rib segment 34 is also rounded to facilitate film direction change.

The threading operation of both embodiments are similar. In each, film 35 is threaded through film slot 23. The film is initially guided in a relatively straight path by rib segment 32 and wall segment 26. The leading edge of the film then strikes wall segment 27 and thereafter a portion of the film end inward of the leading edge contacts the junction of rib segments 32 and 33. This dual contact insures that the film end will be gradually turned into an arcuate path instead of springing back out of the cavity. A further gradual turn is made as the film end travels along the junction of wall segments 27 and 28. It will be noted that this junction includes a fillet to ensure that the change is a gradual one. The fillet is also useful in threading the thicker acetate base film, since this type of film may tend to jam where this junction is angulated. With the film end positively guided and threaded in the channel the film's own spring-like property is relied on to restrain it from springing back out of the channel. The arced film end behaves as a spring and tends to straighten against the guide walls thereby creating a greater frictional hold of the film end in the cavity.

It will therefore be appreciated that by controlling the film end in the manner described above a more positive take-up of highly flexible films is obtainable without the necessity of gripping the film end as taught in the prior art. In addition, since the film is held but not gripped in the channel, the film is readily releasable from the channel during playout of the film from the spool.

The invention has been described in detail with particular reference to preferred embodiments thereof, but it will be understood that variations and modifications can be effected within the spirit and scope of the invention.

What I claim is:

1. An integrally molded one-piece storage device for strips or the like, which device comprises:
   a core including a generally-axially extending surface about which a strip may be wound for storage;
   a generally-axially extending eccentrically disposed cavity formed in the interior of the core for receiving an end portion of the strip, said cavity being defined at least in part by:
   a. a generally-axially extending side wall, and
   b. generally-radially extending end wall means formed adjacent one end of the core;
   a generally-radially-inwardly directed slot formed in the core, said slot having its radially inner terminus at said side wall for guiding the end portion of the strip into said cavity;
   a generally U-shaped channel formed in said cavity and communicating with said slot for guiding the end portion of the strip into a generally arcuate configuration in said cavity, said channel being defined by:
   a. a first guide wall means which is comprised of a portion of said side wall, said first guide wall means having a generally-concave configuration and extending in a generally-axial direction for a distance approximately equal to the axial height of said surface and being adapted to contact one surface of the strip so as to guide the strip in an arcuate path;
   b. a bottom wall which is comprised of said generally-radially extending end wall means; and c. a second guide wall means adapted to contact the opposite surface of the strip, said second guide wall means spaced from respective portions of said first guide wall means so as to define the channel therebetween, and being cooperable with said first guide wall means for guiding the said end portion of the strip into a shape approximating the generally-concave configuration of said first guide wall means, said second guide wall means being connected to said bottom wall and generally-axially extending therefrom a distance substantially less than the axial height of said surface about which the strip may be wound.

2. The invention according to claim 1 wherein said second guide wall means comprises a rib having an axial extent that is substantially less than the axial height of said surface.

3. The invention according to claim 1 wherein said first guide wall means comprises:

a first generally-straight generally-radially-inwardly directed wall segment communicating with said slot for guiding the strip generally radially into said cavity;

a second generally-straight wall segment formed at an obtuse angle relative to said first wall segment and in facing relationship with said slot so as to be adapted to come into contact with the leading edge of said strip and to deflect same from its generally-radially-inwardly directed path; and a third generally-straight generally-radially-outwardly directed wall segment for guiding the strip generally-radially-outwardly;

and wherein said second guide wall means further comprises:

a first generally-straight rib segment spaced from said first radially-inwardly directed wall segment so that said strip may be threaded therebetween and generally radially into said cavity; and a second rib segment connected to said first rib segment and spaced from respective portions of said second wall segment so as to guide the strip therebetween, the junction of said first and second rib segments being adapted to, upon contact with the leading edge of said strip with the second wall segment, contact the strip at a point spaced from the leading edge thereof so as to guide said strip into an arcuate path.

4. The invention according to claim 1 wherein said end wall means includes a thickened land portion that is formed in a portion of the end wall means and which land portion is thicker than said bottom wall of said channel.

5. The invention according to claim 4 wherein said thickened land portion comprises a plateau in relation to said bottom wall of said channel.

6. An integrally molded one-piece storage device for strips or the like, said device including a core that has a surface about which a strip may be wound and means defining a generally U-shaped strip-retention channel formed within said core and which communicates with a slot in said surface for securing the strip to said device, said channel defining means comprising:

a. first guide wall means extending in a generally-axial direction for a distance approximately equal to the axial height of said surface about which the strip may be wound, said first guide wall means being adapted to contact one surface of said strip and having a generally concave configuration for guiding said strip into a generally arcuate path;

b. bottom wall means comprising a generally-radially extending end wall of said core; and c. second guide wall means spaced from respective portions of said first guide wall means so as to define a generally U-shaped channel therebetween and which is cooperable with said first guide wall means for guiding an end portion of said strip to assume a generally concave configuration in said channel, said second guide wall means being adapted to contact the opposite surface of said strip and being connected to said bottom wall and generally-axially extending therefrom a distance substantially less than the axial height of said surface about which the strip may be wound.

* * * * *